June 3, 1930.  F. G. LILJENROTH  1,761,400
METHOD OF PRODUCING A MIXED MANURE CONTAINING
PHOSPHORIC ACID AND NITROGEN
Filed July 23, 1927
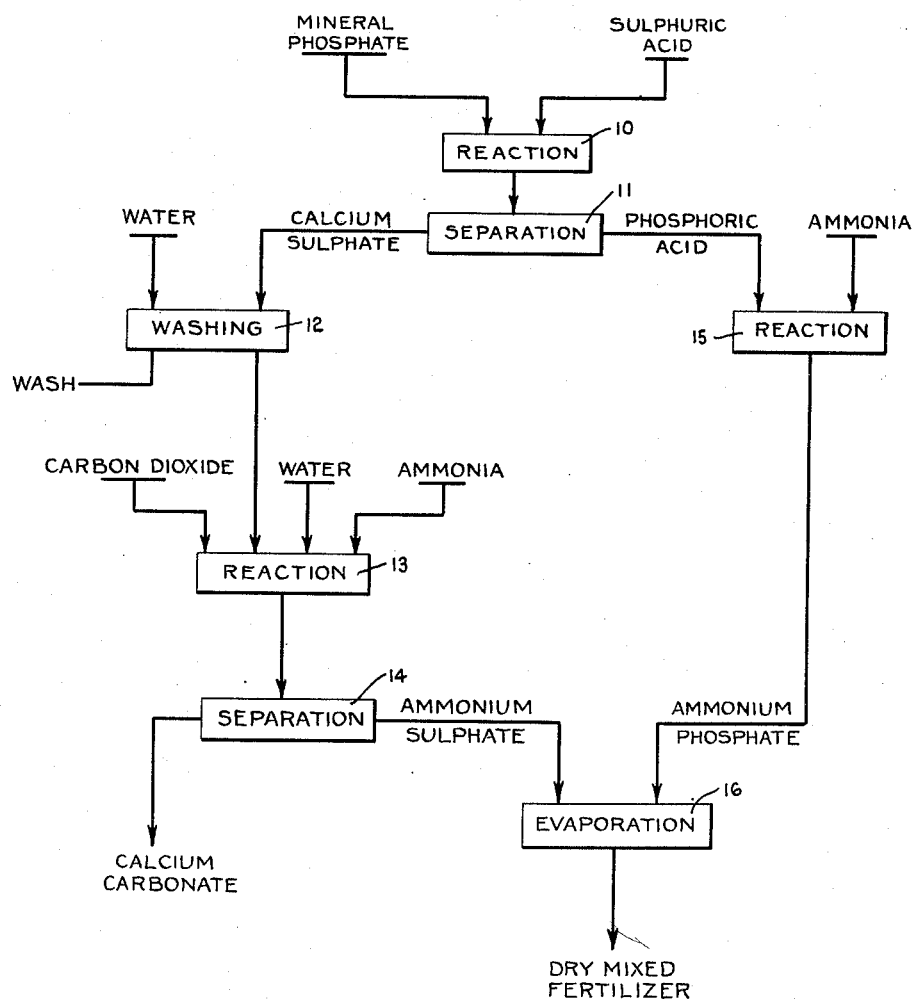
INVENTOR
Frans G. Liljenroth
BY
ATTORNEY Patented June 3, 1930

1,761,400

UNITED STATES PATENT OFFICE

FRANS GEORG LILJENROTH, OF STOCKHOLM, SWEDEN

METHOD OF PRODUCING A MIXED MANURE CONTAINING PHOSPHORIC ACID AND NITROGEN

Application filed July 23, 1927, Serial No. 208,067, and in Sweden August 13, 1926.

This invention relates to a method of producing a fertilizer practically free from lime and containing phosphoric acid substantially in a water-soluble form and nitrogen with mineral phosphate as raw material.

According to the invention the mineral phosphate is first dissolved in sulphuric acid in such quantity and of such concentration that substantially all phosphoric acid of the mineral phosphate goes in solution and a precipitate of calcium sulphate is obtained as finely divided mud. The phosphoric acid is then separated from the precipitate which is carefully washed until all or substantially all phosphoric acid is removed. The separated calcium sulphate substantially free from phosphate and phosphoric acid is repulped in water, while ammonia and carbon dioxide are supplied, calcium carbonate being precipitated and a solution of ammonium sulphate being obtained while the phosphoric acid is saturated with ammonia so as to form ammonium phosphate. The solution of ammonium sulphate is finally evaporated in mixture with the solution of ammonium phosphate whereby an intimate mixture of the ammonium salts is produced.

The process in a preferred form is illustrated in the diagrammatic flowsheet shown in the drawings. The mineral phosphate and sulphuric acid are combined in reaction step 10 to form calcium sulphate and phosphoric acid which are separated in the separation step 11, residual phosphoric acid being removed from the calcium sulphate in washing step 12. The calcium sulphate is then repulped with water and treated with carbon dioxide and water in reaction step 13 to form ammonium sulphate and calcium carbonate, the latter being removed in the separation step 14 while the ammonium sulphate passes with ammonium phosphate from treatment of the phosphoric acid with ammonia in reaction step 15, to the evaporation step 16 from which the dry mixed fertilizer is discharged.

This method is an improvement over the mixture of the ammonium sulphate with the phosphoric acid before treatment with ammonia, since such mixture before instead of after reaction would require excessively large reaction apparatus in which the ammonium sulphate would be relatively inert and would delay somewhat the speed of reaction, thereby increasing substantially the expense of installing and operating this step.

As is clear from the foregoing the sulphuric acid used to dissolve the mineral phosphate is not lost as it is in the usual manufacture of superphosphate in as much as it is wholly utilized for the manufacture of ammonium sulphate and as a by-product chemically precipitated calcium carbonate is obtained from which the carbonic acid used in the process may be recovered by calcining the carbonate or by reacting upon it by means of a suitable acid, as for instance nitric acid. The mixture of ammonium phosphate and ammonium sulphate produced contains phosphoric acid and nitrogen in the most suitable proportions for fertilizing purposes.

What I claim is:

1. The method of producing mixed fertilizer containing phosphoric acid and nitrogen about in the proportion of 1:1 which comprises leaching phosphatic rock with sulphuric acid sufficient to liberate practically all phosphoric acid, separating the phosphoric acid from the insoluble constituents, reacting upon the calcium sulphate of the insoluble residues by ammonia and carbon dioxide so as to produce an equivalent quantity of ammonium sulphate, separating the ammonium sulphate from the calcium carbonate, neutralizing the acid solution obtained in the leaching operation with ammonia so as to form a solution of ammonium phosphate, and evaporating the solution of ammonium sulphate in mixture with the solution of ammonium phosphate.

2. The method of producing mixed fertilizer containing phosphoric acid and nitrogen about in the proportion of 1:1 which comprises leaching phosphatic rock with sulphuric acid sufficient to liberate practically all phosphoric acid and produce calcium sulphate, separating the phosphoric acid from the calcium sulphate, washing the calcium sulphate to remove residual phosphoric acid, reacting upon said calcium sulphate with ammonia and carbon dioxide so as to produce an equivalent quantity of ammonium sulphate from the calcium sulphate, separating the ammonium sulphate from the calcium carbonate, neutralizing said phosphoric acid obtained in the leaching operation, together with the phosphoric acid obtained by washing the calcium sulphate, by means of ammonia to form a solution of ammonium phosphate, mixing said ammonium phosphate solution with said ammonium sulphate and evaporating said mixed solutions.

In testimony whereof I have signed my name.

FRANS GEORG LILJENROTH.